United States Patent
Nakayama

(10) Patent No.: US 9,368,779 B2
(45) Date of Patent: Jun. 14, 2016

(54) COVER OF BATTERY WIRING MODULE, BATTERY WIRING MODULE, AND BATTERY MODULE

(75) Inventor: Osamu Nakayama, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 329 days.

(21) Appl. No.: 14/113,302

(22) PCT Filed: Jun. 5, 2012

(86) PCT No.: PCT/JP2012/064449
§ 371 (c)(1),
(2), (4) Date: Oct. 22, 2013

(87) PCT Pub. No.: WO2013/008559
PCT Pub. Date: Jan. 17, 2013

(65) Prior Publication Data
US 2014/0045029 A1    Feb. 13, 2014

(30) Foreign Application Priority Data
Jul. 11, 2011   (JP) .................................. 2011-152962

(51) Int. Cl.
*H01M 2/20*      (2006.01)
*B60L 11/18*     (2006.01)
(Continued)

(52) U.S. Cl.
CPC ........... *H01M 2/206* (2013.01); *B60L 11/1803* (2013.01); *B60L 11/1864* (2013.01);
(Continued)

(58) Field of Classification Search
CPC ............ H01M 2/1229; H01M 2/1241; H01M 2/1252; H01M 2220/20
USPC .......................................................... 429/82
See application file for complete search history.

(56) References Cited

U.S. PATENT DOCUMENTS

2002/0006544 A1    1/2002  Asaka et al.
2010/0173189 A1*   7/2010  Suzuki ............... H01M 2/1077
                                                     429/158

FOREIGN PATENT DOCUMENTS

EP          0986114        3/2000
EP          2187465        5/2010
(Continued)

OTHER PUBLICATIONS

International Search Report, mail date is Jul. 10, 2012.
Search report from E.P.O., mail date is Mar. 18, 2015.

*Primary Examiner* — Mark F Huff
*Assistant Examiner* — Monique Wills
(74) *Attorney, Agent, or Firm* — Greenblum & Bernstein, P.L.C.

(57) ABSTRACT

A cover of battery wiring modules, which include connection members electrically connecting electrode terminals of banks of single batteries, the banks of single batteries being configured by aligning a plurality of single batteries. The cover includes a plate-shaped cover main body covering the battery wiring modules; a first engagement portion provided on a first surface side of the cover main body and engaging with an engaged projection of the battery wiring module; and a second engagement portion provided on a second surface side of the cover main body and engaging with an engaged portion of a battery wiring module different from the battery wiring module.

12 Claims, 16 Drawing Sheets

(51) Int. Cl.
  *H01M 2/10* (2006.01)
  *H01R 11/28* (2006.01)
(52) U.S. Cl.
  CPC ......... *B60L11/1879* (2013.01); *H01M 2/1077*
    (2013.01); *B60L 2240/545* (2013.01); *B60L
    2240/547* (2013.01); *B60L 2240/549* (2013.01);
    *H01M 2/1061* (2013.01); *H01R 11/288*
    (2013.01); *H01R 2201/26* (2013.01); *Y02T
    10/7005* (2013.01); *Y02T 10/7061* (2013.01)

(56) References Cited

FOREIGN PATENT DOCUMENTS

| | | |
|---|---|---|
| JP | 11-067184 | 3/1999 |
| JP | 2002-033088 | 1/2002 |
| JP | 2004-171856 | 6/2004 |
| JP | 2011-008957 | 1/2011 |
| WO | 2011/078220 | 6/2011 |

* cited by examiner

COVER OF BATTERY WIRING MODULE, BATTERY WIRING MODULE, AND BATTERY MODULE

FIELD OF THE INVENTION

The present invention relates to a cover of a battery wiring module, a battery wiring module, and a battery module.

BACKGROUND OF THE INVENTION

A battery module for use in a vehicle such as an electric automobile or hybrid car has a plurality of single batteries arrayed in lines, the single batteries having positive and negative electrode terminals. The plurality of single batteries are connected serially or in parallel by connecting the electrode terminals of adjacent single batteries with a connection member (bus bar) (see Patent Literature 1).

Thus, as shown in Patent Literature 2, in order to simplify work of attaching the connection member, the connection member is housed in a plurality of resin connecting units, the connecting units are linked together in a battery connection assembly, and the battery connection assembly is integrally mounted on a bank of single batteries, the bank of single batteries being configured by the plurality of single batteries.

Then, when the battery connection assembly is mounted in the bank of single batteries, a cover is placed on the battery connection assembly (a battery wiring module) in order to insulate the electrode terminals, connection members, and so on from an exterior.

RELATED ART

Patent Literature

Patent Literature 1: Japanese Patent Laid-open Publication No. H11-067184
Patent Literature 1: Japanese Patent Laid-open Publication No. 2011-8957

SUMMARY OF THE INVENTION

Problems to Be Solved by the Invention

However, when the battery wiring module is attached to a plurality of the banks of single batteries, a cover is needed for each of the battery wiring modules, thus resulting in a plurality of covers as well. However, in preparing a number of covers corresponding to a shape of the battery wiring module, many kinds of covers are used, cost of dies for molding the covers increase. Further, due to a greater variety of components being used, there is a concern that a reduction in workability may result.

The present invention was achieved based on the above-noted circumstances and has as an object to universalize a cover mounted on a plurality of battery wiring modules.

Means for Solving the Problems

The present invention is a cover of a battery wiring module that includes a connection member electrically connecting electrode terminals of a bank of single batteries configured by aligning a plurality of single batteries having positive and negative electrode terminals, the cover including a cover main body, a first engagement portion, and a second engagement portion. The plate-shaped cover main body covers the battery wiring module. The first engagement portion is provided on a first surface side of the cover main body and engages with an engaged portion of the battery wiring module. The second engagement portion is provided on a second surface side of the cover main body and engages with an engaged portion of a battery wiring module different from the battery wiring module.

According to the cover of the present configuration, engagement of the first surface side of the cover main body with the battery wiring module becomes possible. In addition, engagement of the second surface side of the cover main body with the battery wiring module different from the battery wiring module also becomes possible. Thus, one cover can be attached to a plurality of battery wiring modules having different shapes, and therefore universalizing the cover mounted on the plurality of battery wiring modules is possible. In addition, by universalizing the cover of the battery wiring modules, cost of the die used to mold the cover can be reduced, misassembly due to a reduction in types of components can be inhibited, and a component maintenance burden can be alleviated.

In addition to the above configuration, having the following configuration is more preferable.

The engaged portion is a projection projecting from a side wall of the battery wiring module. In addition, the first engagement portion and the second engagement portion project from the cover main body and also include engagement holes into which the projections advance. The projections are engaged on an edge of the engagement holes.

In this way, the cover can be engaged with a simple configuration.

The first engagement portion and the second engagement portion are formed to be mutually positionally offset in an opening direction of the engagement holes.

In this way, molding with the die can be readily performed.

The first engagement portion and the second engagement portion are formed in a line along a terminal edge of the cover main body.

In this way, molding with the die can be readily performed. In addition, because both the first engagement portion and the second engagement portion are formed on the terminal edge of the cover main body, surface area of the cover main body can be effectively utilized.

A battery wiring module covered by the cover is achieved.
A battery module is achieved configured with a plurality of single batteries and the battery wiring module attached to the plurality of single batteries.

Effect of the Invention

According to the present invention, a cover mounted on a plurality of battery wiring modules can be universalized.

MODE FOR CARRYING OUT THE INVENTION

Embodiment 1

Figure 1:
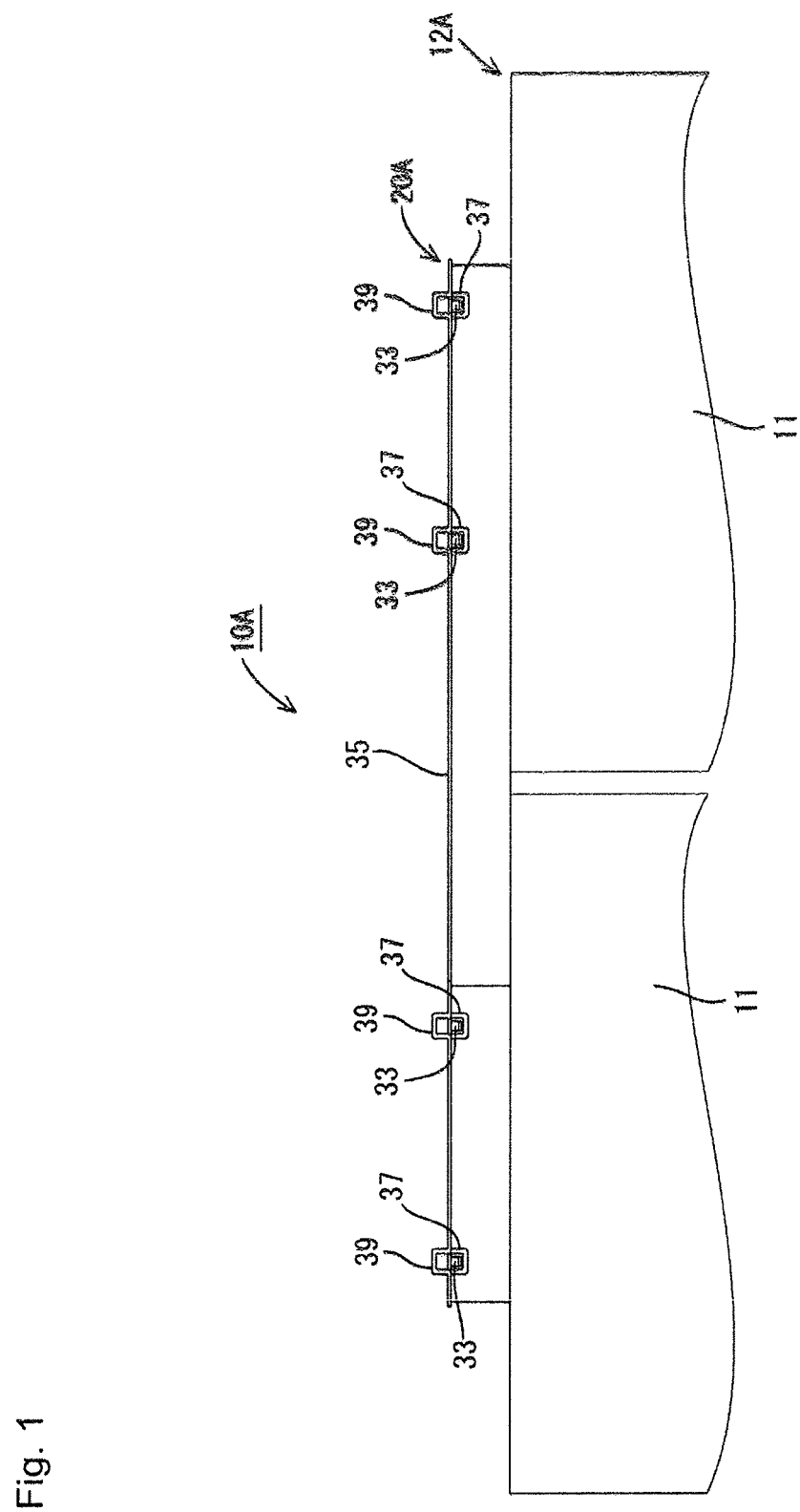
FIG. 1 is a front view showing a battery module (partially omitted) having a cover according to Embodiment 1 attached thereto.
Figure 12:
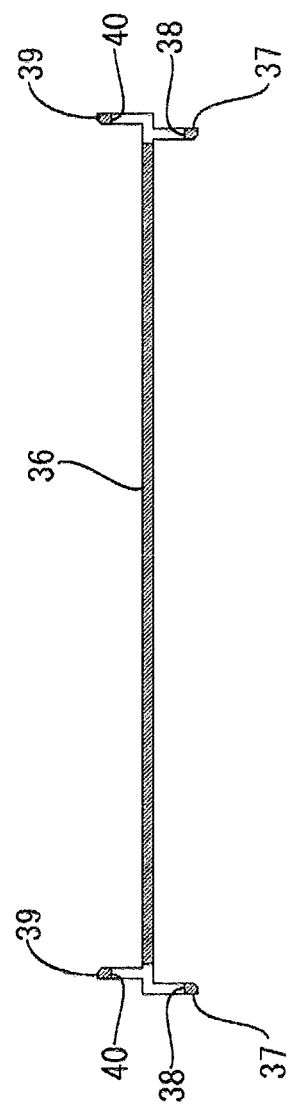
FIG. 12 is a cross-sectional view along a line A-A in FIG. 9.
Figure 13:
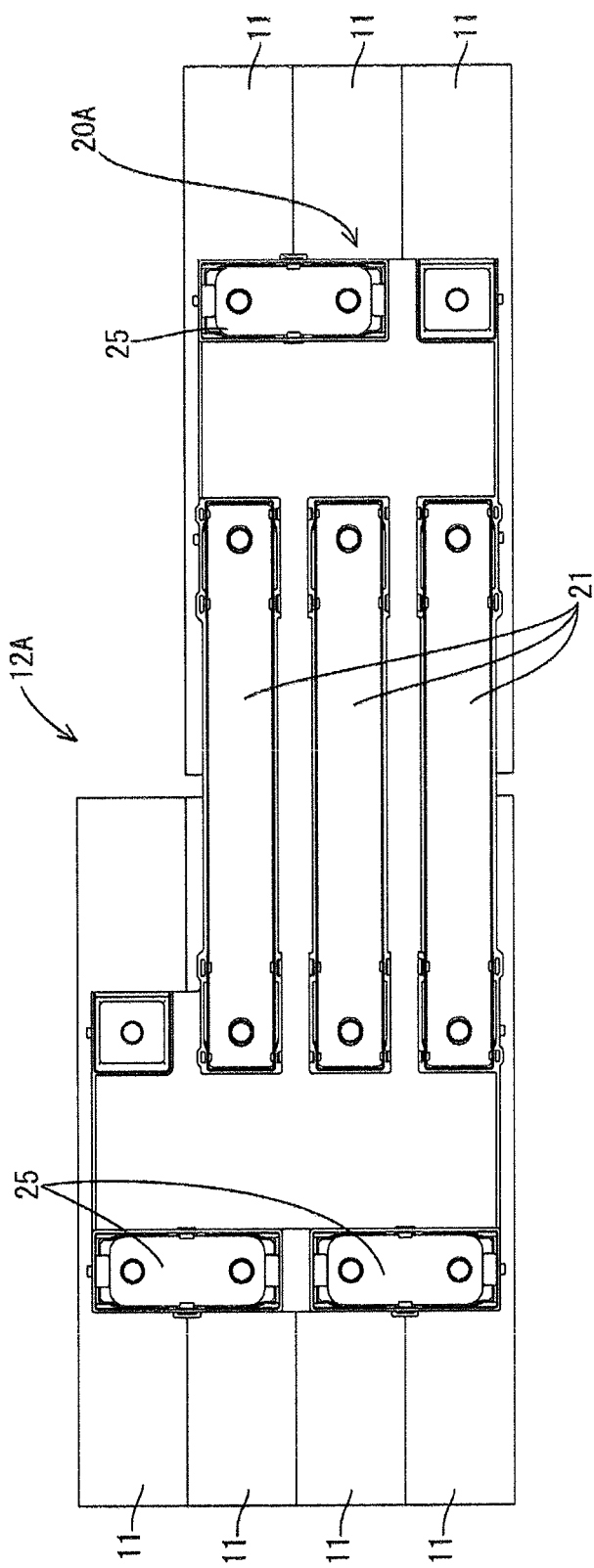
FIG. 13 is a plan view showing the first battery module before the cover is mounted.
Figure 14:
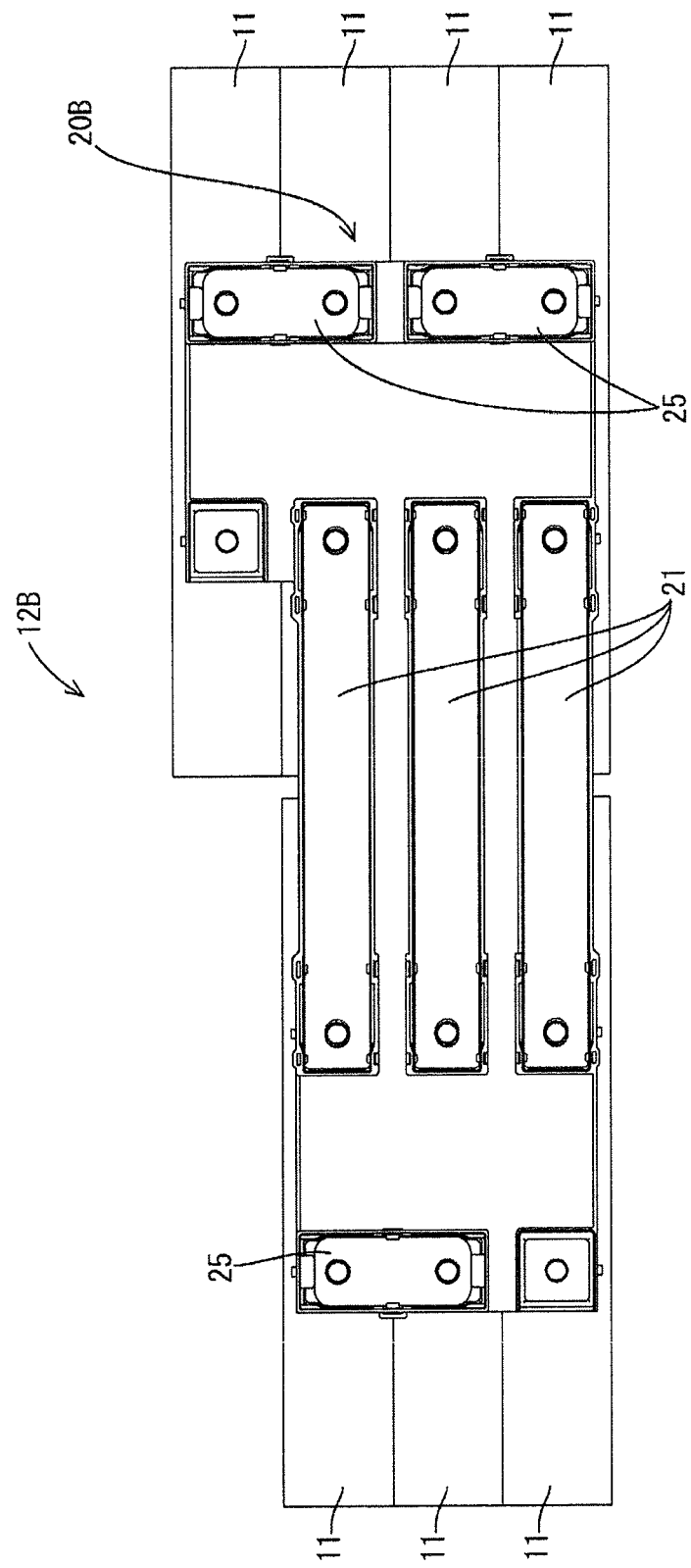
FIG. 14 is a plan view showing the second battery module before the cover is mounted.

Hereafter, Embodiment 1 of the present invention is described with reference to FIGS. 1 to 14. As shown in FIGS. 13 and 14, battery wiring modules 20A and 20B covered by a cover 35 according to the present embodiment are configured to include connection members 21 and 25 electrically connecting a plurality of single batteries 11. Battery modules 10A and 10B, which are configured by attaching the battery wiring modules 20A and 20B to the plurality of single batteries 11, are used as a drive source in a vehicle such as an electric automobile or hybrid automobile, for example. Hereafter, the description is given with FIGS. 1 and 3 as a reference for a vertical direction, while a front-back direction takes a right direction in FIGS. 2 and 4 as a front side and a left direction as a back side.

Figure 2:
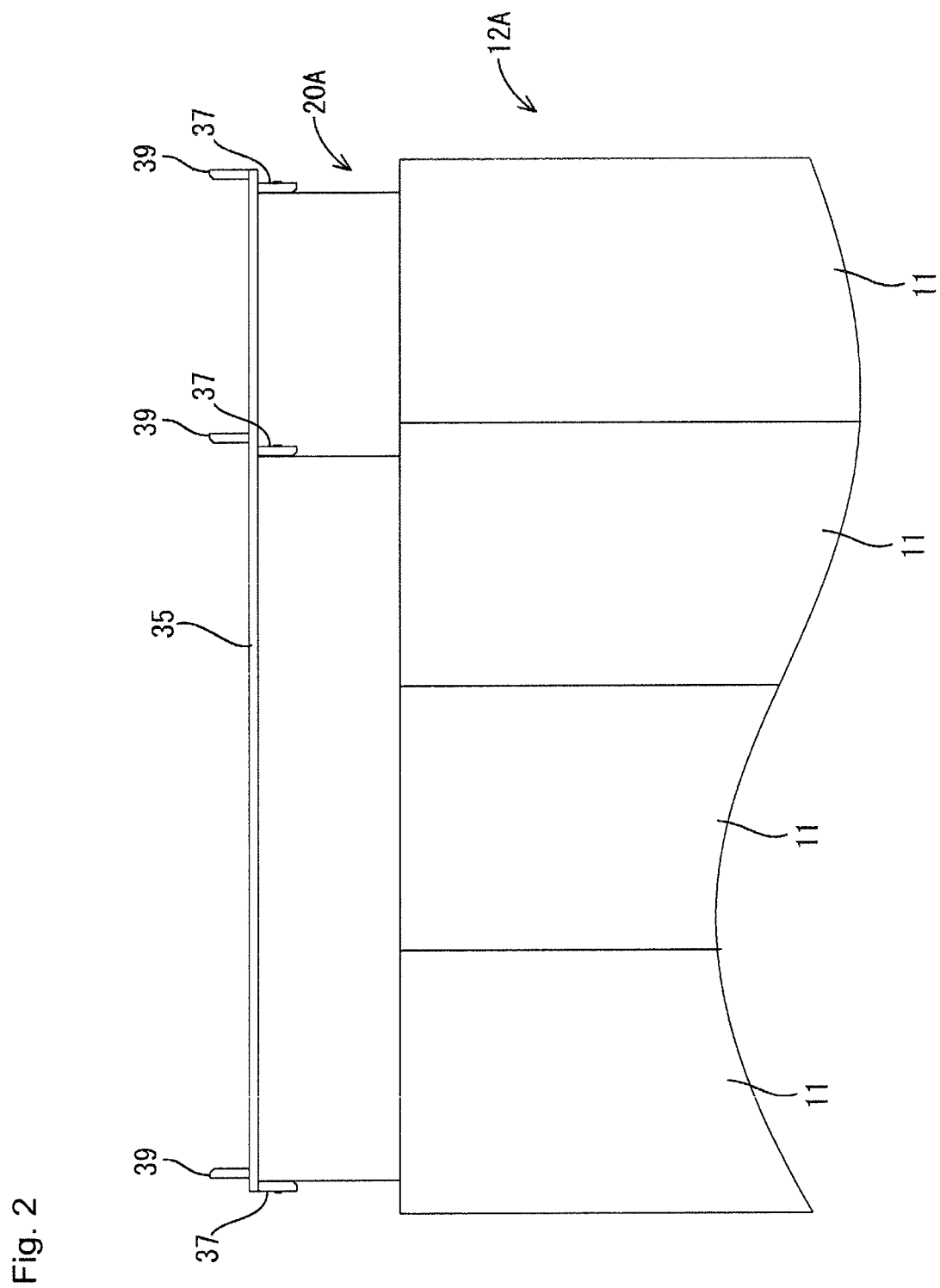
FIG. 2 is a lateral view showing the battery module (partially omitted) having the cover attached thereto.
Figure 3:
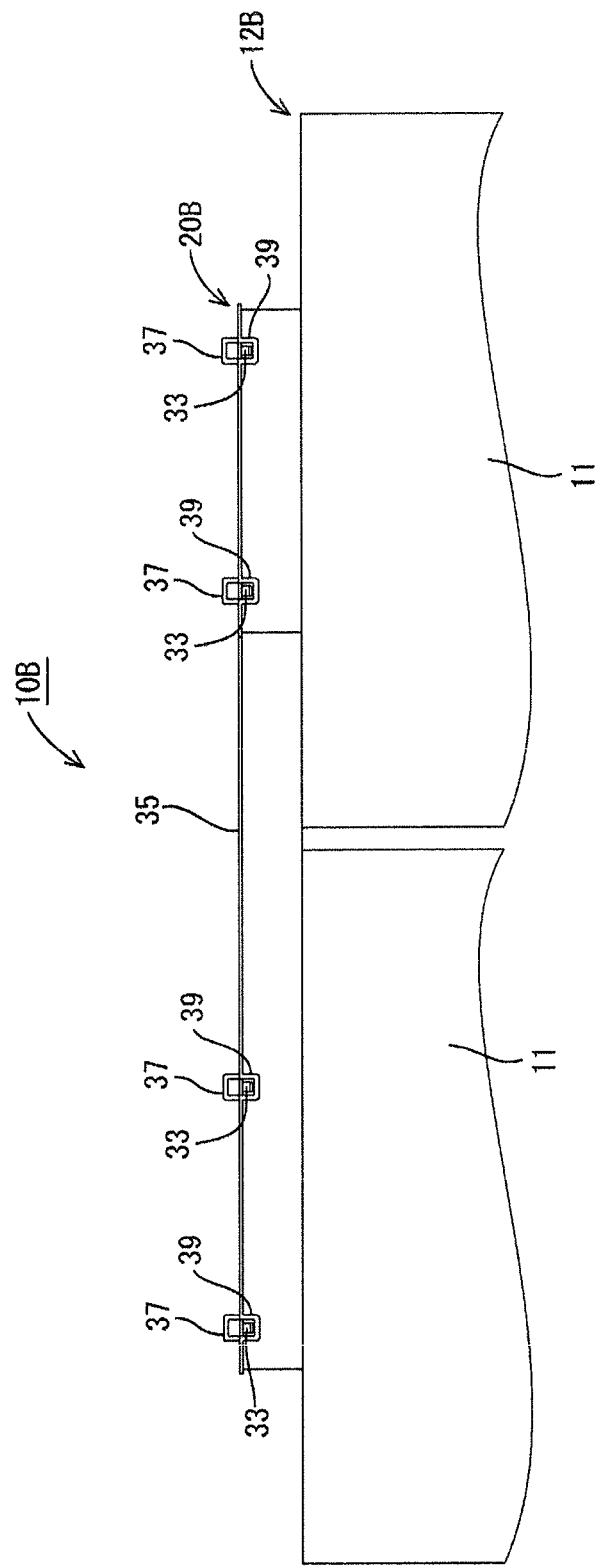
FIG. 3 is a front view showing a battery module (partially omitted) having the cover attached thereto.
Figure 4:
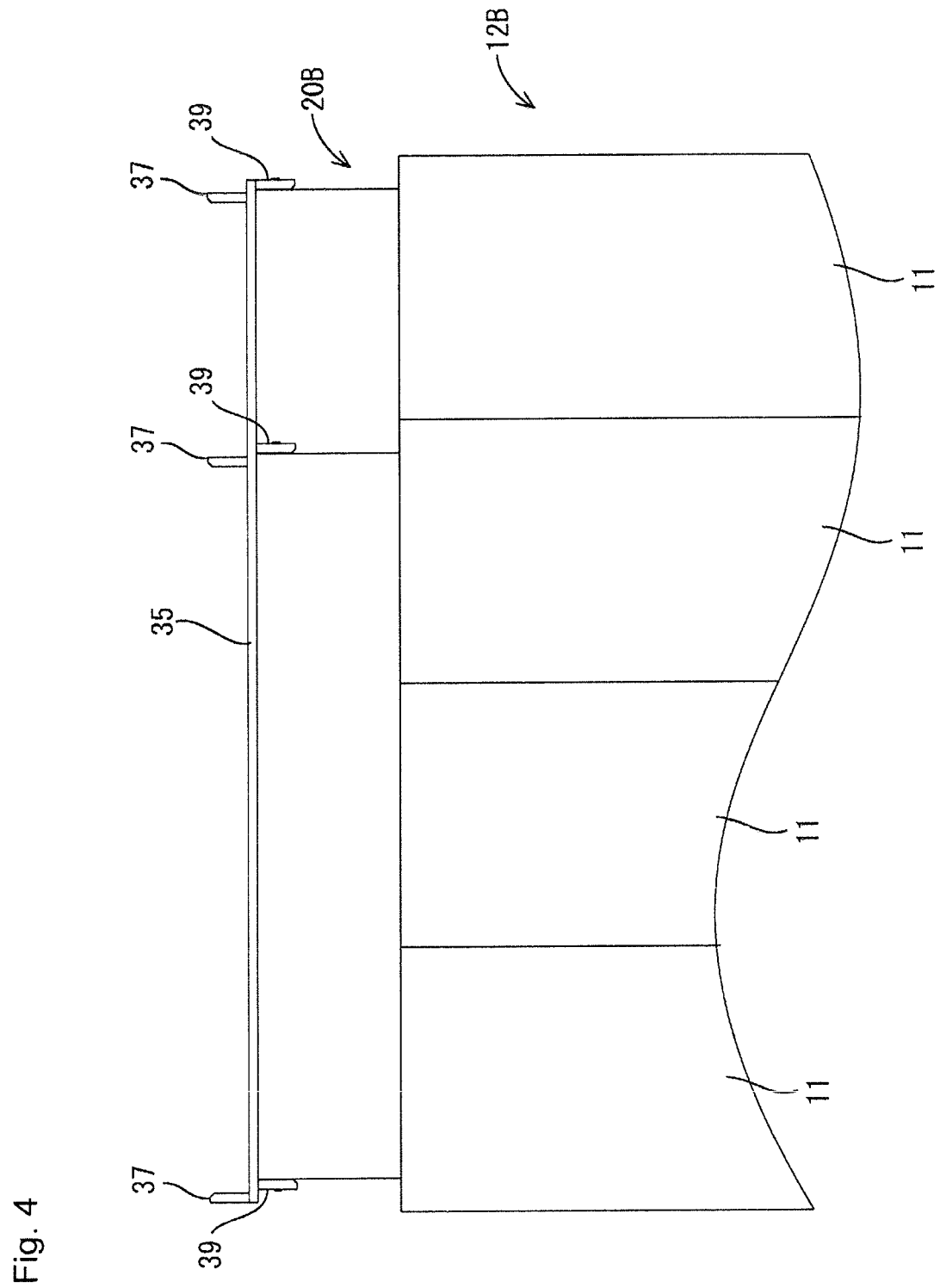
FIG. 4 is a lateral view showing the battery module (partially omitted) having the cover attached thereto.

As shown in FIG. 2, the first battery module 10A includes a bank of single batteries 12A configured by aligning the plurality of single batteries 11, and the battery wiring module 20A attached to the bank of single batteries 12A and serially connecting the plurality of single batteries 11. As shown in FIG. 4, the second battery module 10B includes a bank of single batteries 12B configured by the plurality of single batteries 11, and the battery wiring module 20B attached to the bank of single batteries 12A and serially connecting the plurality of single batteries 11.

Figure 6:
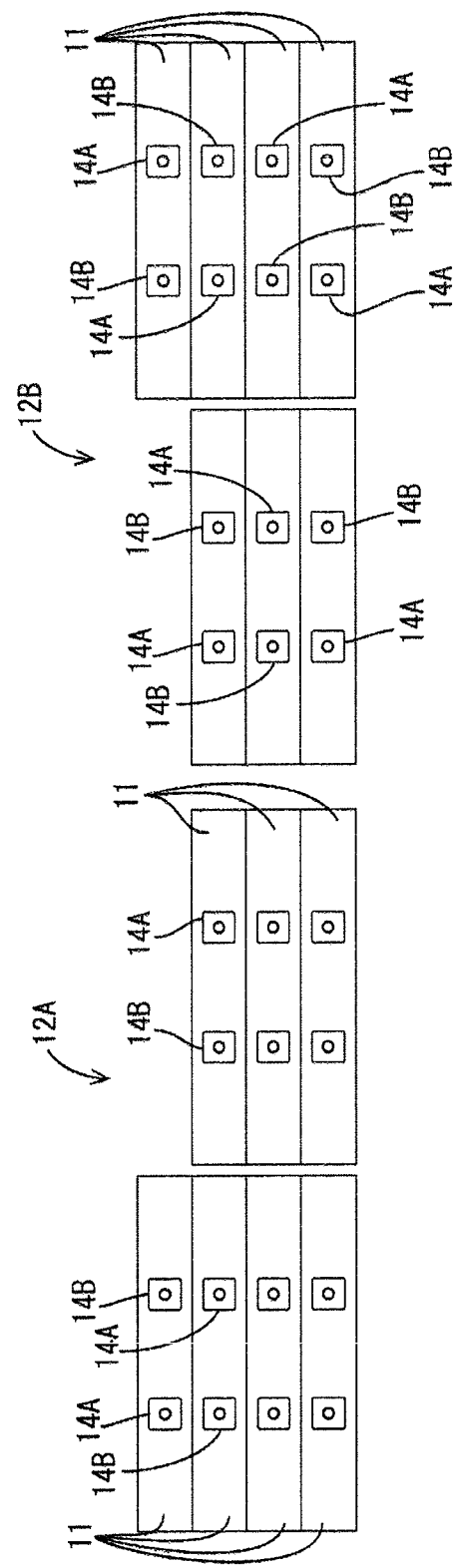
FIG. 6 is a plan view showing two banks of single batteries.

As shown in FIG. 6, the banks of single batteries 12A and 12B both have seven (a plurality) of the single batteries 11 configured by two rows (a row of four layers and a row of three layers). The banks of single batteries 12A and 12B are arranged symmetrically about an axis on a width-direction middle of the banks of single batteries 12A and 12B. The single batteries 11 include electrode terminals 14A and 14B (in the drawings, a positive electrode is 14A and a negative electrode is 14B) projecting perpendicularly from a top surface of a flat, parallelepiped main body, the main body having an electricity generating element (not illustrated) housed in an interior thereof.

Each of the electrode terminals 14A and 14B is a squared tubular nut with a circular screw hole forming a through-hole in a center thereof. Through-holes 21A and 25A on the connection members 21 and 25, respectively, are matched to the screw holes of the nuts, then a shaft of a bolt is screwed thereto, fixating the battery wiring modules 20A and 20B.

Each of the single batteries 11 is oriented such that front-back (short) direction and left-right (length) direction adjacent electrode terminals 14A and 14B have opposite polarities. In addition, the banks of single batteries 12A and 12B are fixated by a holding plate not shown in the drawings.

Figure 7:
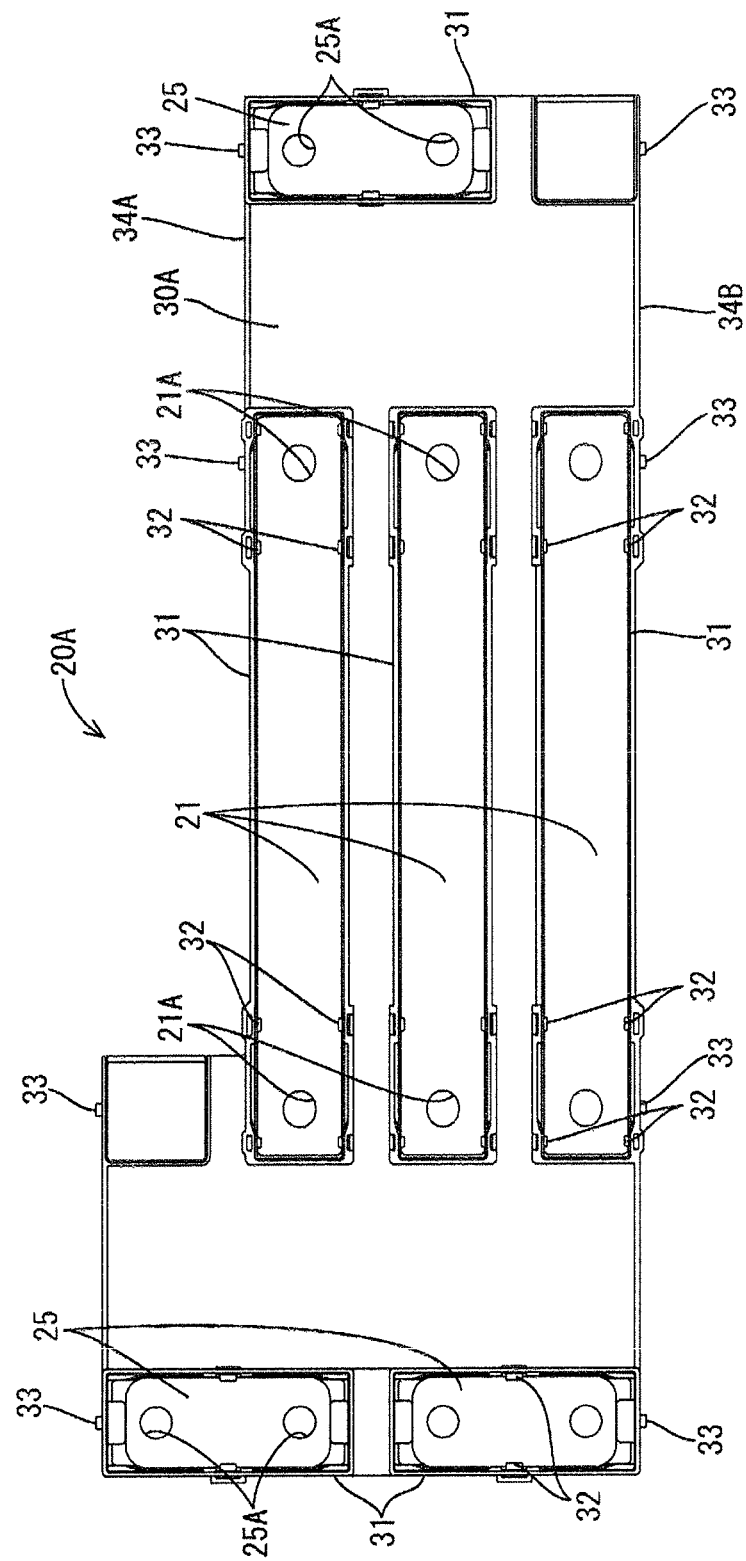
FIG. 7 is a plan view showing a first battery wiring module.
Figure 8:
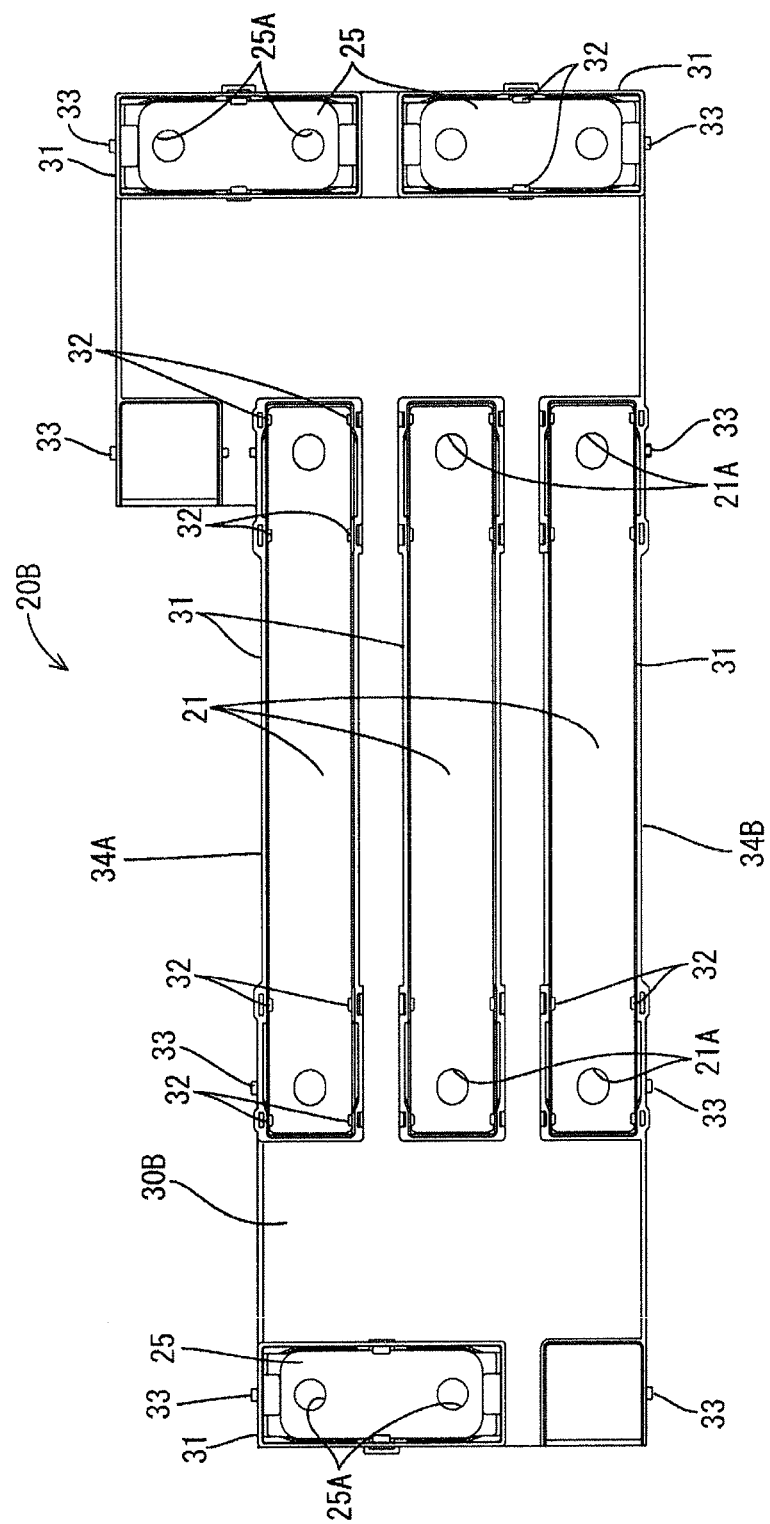
FIG. 8 is a plan view showing a second battery wiring module.

The battery wiring modules 20A and 20B integrally connect the plurality of single batteries 11 and, as shown in FIGS. 7 and 8, have mutually symmetrical shapes. In addition, the battery wiring modules 20A and 20B include a long connection member 21 (an example of the "connection member" configuring the present invention) connecting left-right adjacent electrode terminals 14A and 14B, a short connection member 25 (an example of the "connection member" configuring the present invention) connecting the electrode terminals 14A and 14B of front-back adjacent single batteries 11 at a shorter distance than that of the long connection member 21, and holding members 30A (holding member of the battery wiring module 20A) and 30B (holding member of the battery wiring module 20B) made of a synthetic resin and accommodating the connection members 21 and 25.

The long connection member 21 is configured with a metal such as copper, a copper alloy, stainless steel (SUS), aluminum, or the like. The long connection member 21 has a plate shape of a length corresponding to a measurement between the left-right connected electrode terminals 14A and 14B. A pair of the through-holes 21A is formed running through front and back end portions of the long connection member 21, the shaft of the bolt (fastening member) being inserted through the through-holes 21A. A shape of the through-holes 21A is an elliptical shape longer in the left-right direction.

The short connection member 25 is configured with a metal such as copper, a copper alloy, stainless steel (SUS), aluminum, or the like. The short connection member 25 has a substantially rectangular plate shape of a length corresponding to a measurement between the front-back connected electrode terminals 14A and 14B. A pair of the through-holes 25A is formed running through the short connection member 25, the shaft of the bolt being inserted through the through-holes 25A.

Moreover, although not depicted in the drawings, the electrode terminals 14A and 14B positioned at ends of the serial connection are inserted through the through-holes of end portion connection members. The electrode terminals 14A and 14B can thus connect to a terminal at an end of an electric wire linked to an exterior inverter or the like, via an external connection terminal (not depicted) provided to the end portion connection members. In addition, although not depicted in the drawings, a voltage detecting terminal for detecting voltage of the single battery 11 is overlaid on the connection members 21 and 25 and a wire for voltage detection is connected by crimping or the like to the voltage detecting terminal. The wire for voltage detection is connected to a battery ECU (not shown in the drawings). The battery ECU has a microcomputer, an element, and the like installed therein and has a known configuration that includes functions for detecting the voltage, current, temperature, or the like of the single battery 11, for controlling power storage and release of each of the single batteries 11, and so on.

Holding members 30A and 30B are flat members made of a synthetic resin capable of holding the connection members 21 and 25. The holding members 30A and 30B have substantially "L" shapes (shapes where a rectangular corner portion is cut away from a rectangular shape) and the shapes are mutually symmetrical in the left-right direction. The holding members 30A and 30B also include a plurality of accommodators 31 accommodating the connection members 21 and 25.

The plurality of accommodators 31 are configured with a short accommodator accommodating the short connection member 25 and a long accommodator accommodating the long connection member 21. Both of these include a bottom plate on which the connection members 21 and 25 are placed and a square tube-shaped accommodating wall encircling the connection members 21 and 25. A portion of the bottom plate where the electrode terminals 14A and 14B enter forms an opening with no bottom plate.

The accommodating wall is set to a height capable of preventing a tool or the like from contacting a head portion of the connection members 21 and 25, the bolt, or the like and causing a short circuit. An inner surface of the accommodating wall includes a separation regulating piece 32 capable of flexure deformation, the separation regulating piece 32 constraining separation of the connection members 21 and 25. The separation regulating piece 32 is formed by cutting a squared "U" shape out of the accommodating wall and positioning a claw-shaped forefront end above the connection members 21 and 25, thereby constraining separation of the connection members 21 and 25. Moreover, a positioning portion positioning the short connection member 25 is formed in a gap between the short connection member 25 and the accommodating wall on the accommodator 31. The positioning portion is formed to a height such that a tool does not contact the positioning portion when bolt-fastening.

A lateral surface around the entire circumference of the holding members 30A and 30B includes a lateral surface 34A (side wall) on a forward end and a lateral face 34B (side wall) on a rear end. A plurality of engaged projections 33 (an example of a "projection" configuring the present invention) projecting forward and rearward (laterally (outward)), respectively, are formed at predetermined intervals on the lateral surfaces 34A and 34B. A left-right position of the engaged projections 33 is formed at a position roughly proximate to the through-holes 21A and 25A of the connection members 21 and 25.

A shape of the engaged projections 33 is a shape where a bottom end (end on the single battery 11 side) projects in a step shape and a projection dimension becomes smaller in an inclined shape toward the top. Herein, a universal cover 35 is put over the battery wiring modules 20A and 20B for insulation from the exterior, to protect the interior, and so on.

Figure 11:
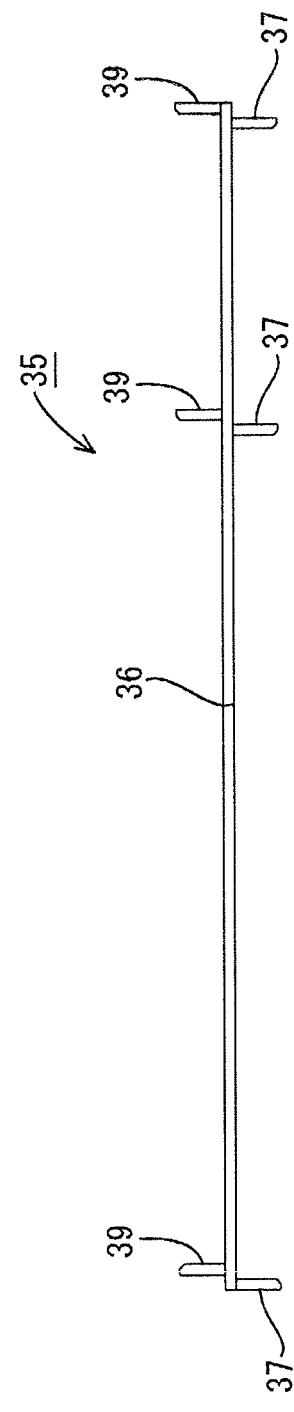
FIG. 11 is a lateral view of the cover.

As shown in FIG. 11, the cover 35 includes a flat plate-shaped cover main body 36, a first engagement portion 37, and a second engagement portion 39. The first engagement portion 37 is provided so as to project below the cover main body 36 (on a first surface side) and engages with the engaged projection 33 of the battery wiring module 20A. The second engagement portion 39 is provided so as to project above the cover main body 36 (on a second surface side) and engages with the engaged projection 33 of the battery wiring module 20B, which differs from the battery wiring module 20A.

Figure 9:
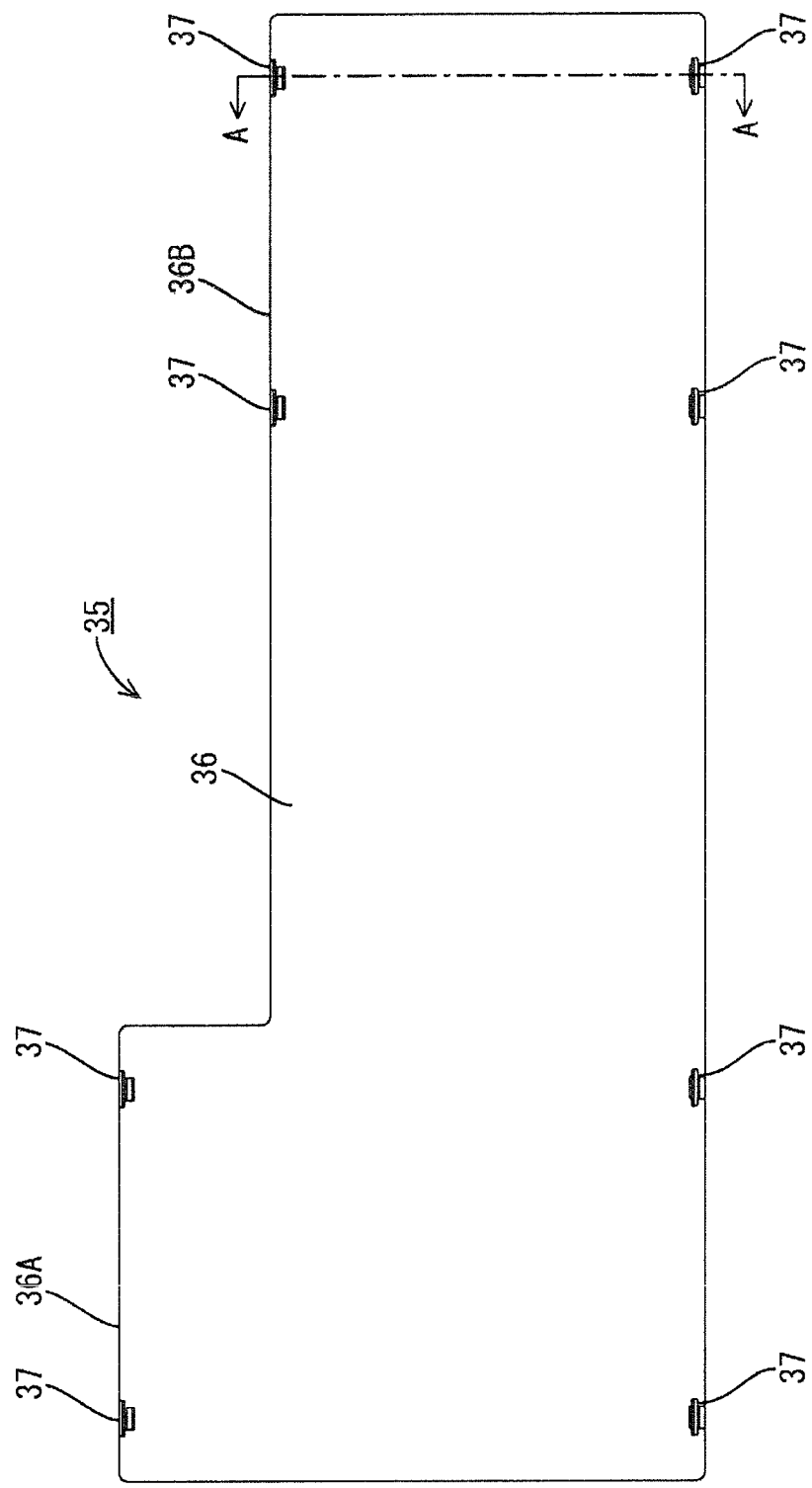
FIG. 9 shows a surface on the first engagement portion side of the cover.
Figure 10:
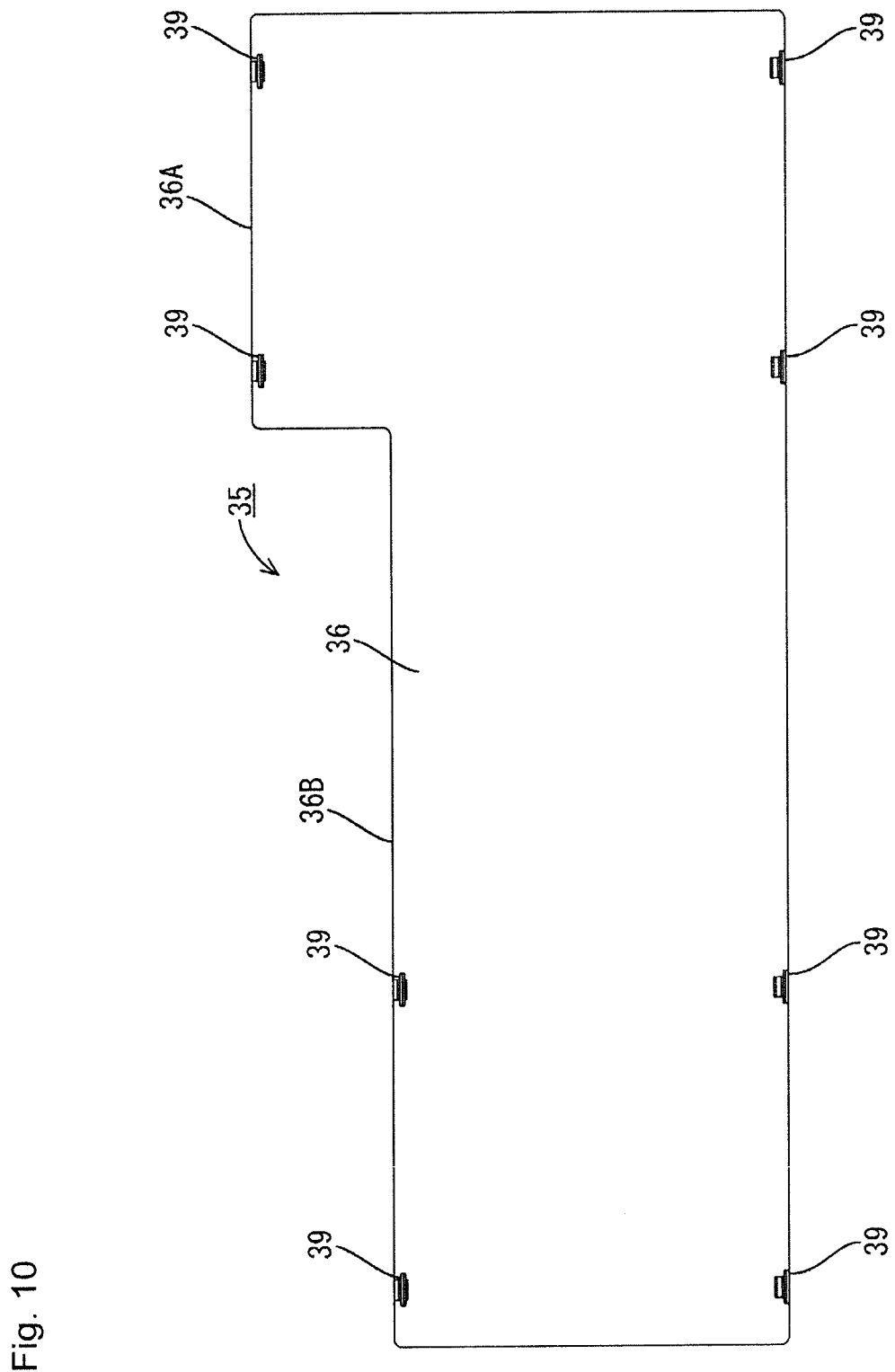
FIG. 10 shows a surface on the second engagement portion side of the cover.

As shown in FIG. 9, the cover main body 36 has an "L" shape similar to the upper surface shape of the battery wiring modules 20A and 20B such that the cover main body 36 can cover the first battery wiring module 20A with the first surface and the second battery wiring module 20B with the opposite side surface. More specifically, the shape has a rectangular corner portion cut away from a rectangular shape. The shape is configured with a long side 36A having a long dimension in the front-back direction and a short side 36B having a dimension in the front-back direction reduced in a stepped shape from the long side 36A. The first engagement portion 37 and the second engagement portion 39 are provided on the front and back ends (terminal edges) of the cover main body 36 and, in addition, the first engagement portion 37 and the second engagement portion 39 are not provided on the left and right ends.

The first engagement portion 37 rises upward on the end (terminal edge) of the cover main body 36 in a squared frame shape (squared "U" shape) in a direction orthogonal to the surface of the cover main body 36. As shown in FIG. 12, a rectangular first engagement hole 38 runs through an interior side of the first engagement portion 37. An edge of the first engagement hole 38 is engaged on the engaged projection 33 of the battery wiring module 20A.

Figure 5:
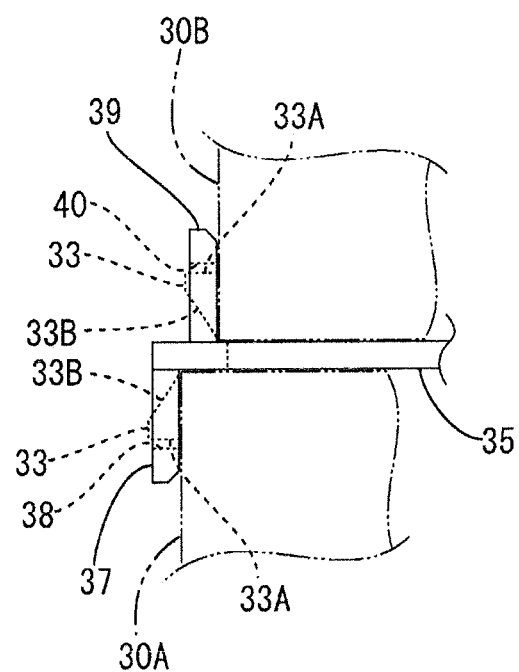
FIG. 5 shows an expanded view of portions of a first engagement portion and a second engagement portion of the cover.

The second engagement portion 39 has the same shape as the first engagement portion 37 and rises upward in a squared frame shape (squared "U" shape) in a direction orthogonal to the surface of the cover main body 36 (a direction 180 degrees opposite to that of the first engagement portion 37) on the end (terminal edge) of the cover main body 36. The second engagement portion 39 is formed offset from the position of the first engagement portion 37 in an opening direction of the first engagement hole 38 by roughly a measurement somewhat bigger than a thickness measurement of the first engagement portion 37 (by a measurement capable of molding the first engagement portion and the second engagement portion with a molding die). A rectangular second engagement hole 40 runs through an interior side of the second engagement portion 39. An edge of the second engagement hole 40 is engaged on the engaged projection 33 of the battery wiring module 20B (FIG. 5).

Next, assembly of the battery modules 10A and 10B is described. A plurality of the covers 35 having the same shape are prepared ahead of time. Then, each of the connection members 21 and 25 and the end connection members (not shown in the drawings) are mounted on each of the holding members 30A and 30B. In addition, the voltage detecting terminals (not shown in the drawings) connected to the terminal portion of the wire for voltage detection are placed so as to overlap on the connection members 21 and 25, thereby forming the battery wiring modules 20A and 20B (FIGS. 7 and 8).

Next, the battery wiring modules 20A and 20B are attached to the banks of single batteries 12A and 12B (FIGS. 13 and 14), then bolt-fastened on the electrode terminals 14A and 14B at the positions of the through-holes 21A and 25A of the connection members 21 and 25 to fixate the battery wiring modules 20A and 20B to the banks of single batteries 12A and 12B.

Next, a surface on the first engagement portion 37 side of any one of the plurality of covers 35 is placed over the battery wiring module 20A fixated to the bank of single batteries 12A so as to cover it. At this point, the first engagement portion 37 abuts an inclined portion 33B of the engaged projection 33 provided on the lateral surface (side wall) of the battery wiring module 20A and flexure deforms, then restoration deforms when the forefront end side of the first engagement portion 37 passes the engaged projection 33. Thereby, even when a force is generated in a direction that would remove the cover 35, the edge of the first engagement hole 38 is engaged by a stepped portion 33A on the bottom surface of the engaged projection 33 and thus the cover 35 in place is held so as to not be removed (FIG. 5).

Next, a surface on the second engagement portion 39 side of another one of the plurality of covers 35 is placed over the battery wiring module 20B fixated to the bank of single batteries 12B. At this point, the second engagement portion 39 abuts an inclined portion 33B of the engaged projection 33 provided on the lateral surface (side wall) of the battery wiring module 20B and flexure deforms, then restoration deforms when the forefront end of the second engagement portion 39 passes the engaged projection 33. Thereby, even when a force is generated in a direction that would remove the cover 35, the edge of the second engagement hole 40 is engaged by the stepped portion 33A on the bottom surface of the engaged projection 33 and thus the cover 35 in place is held so as to not be removed. Thereby, the battery modules 10A and 10B are formed in a state where the cover 35 is attached to the battery wiring modules 20A and 20B.

The present embodiment achieves the following advantageous effects.

(1) The cover 35 of the battery wiring modules 20A and 20B includes the plate-shaped cover main body 36, the first engagement portion 37, and the second engagement portion 39, the battery wiring modules 20A and 20B including the connection members 21 and 25 electrically connecting the electrode terminals 14A and 14B of the banks of single batteries 12A and 12B, the banks of single batteries 12A and 12B being configured by aligning a plurality of the single batteries 11 having the positive and negative electrode terminals 14A and 14B. The plate-shaped cover main body 36 covers the upper surface of the battery wiring modules 20A and 20B. The first engagement portion 37 is provided on the first surface side of the cover main body 36 and engages with the engaged projection 33 (engaged portion) of the battery wiring module 20A. The second engagement portion 39 is provided on the second surface side of the cover main body 36 and engages with the engaged projection 33 (engaged portion) of the battery wiring module 20B, which differs from the battery wiring module 20A.

According to the cover 35 of the present embodiment, attachment of the first surface side of the cover main body 36 with the battery wiring module 20A becomes possible. In addition, attachment of the second surface side of the cover main body 36 with the battery wiring module 20B, which differs from the battery wiring module 20A, also becomes possible. Therefore, attachment to a plurality of battery wiring modules 20A and 20B having different shapes is enabled with one cover 35. Thus, universalizing the cover 35 mounted on the plurality of battery wiring modules 20A and 20B is possible. In addition, by universalizing the cover 35, cost of the die used to mold the cover 35 can be reduced, misassembly due to a reduction in types of components can be inhibited, and a component maintenance burden can be alleviated.

(2) The engaged portions are the engaged projections 33 (projections) projecting from the lateral surfaces 34A and 34B (side walls) of the battery wiring modules 20A and 20B. In addition, the first engagement portion 37 and the second engagement portion 39 project from the cover main body 36 and also include the engagement holes 38 and 40 into which the engaged projections 33 advance. The engaged projections 33 are engaged on the edges of the engagement holes 38 and 40. In this way, the cover 35 can be engaged with a simple configuration.

(3) The first engagement portion 37 and the second engagement portion 39 are formed to be positionally offset in the opening direction of the engagement holes 38 and 40. In this way, molding with the die can be readily performed.

Embodiment 2

Figure 15:
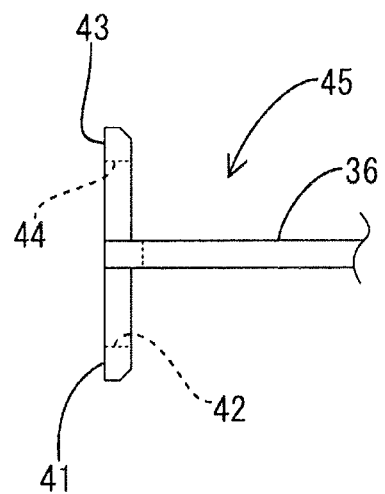
FIG. 15 is a lateral view showing an expanded view of a first engagement portion and a second engagement portion of a cover according to Embodiment 2.
Figure 16:
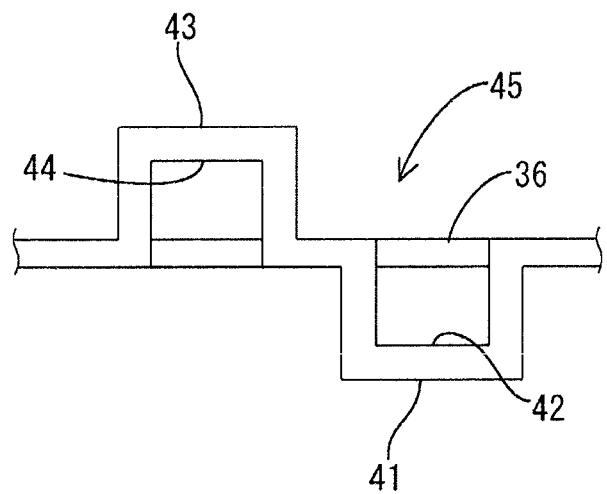
FIG. 16 is a front view showing an expanded view of the first engagement portion and the second engagement portion of the cover.
Figure 17:
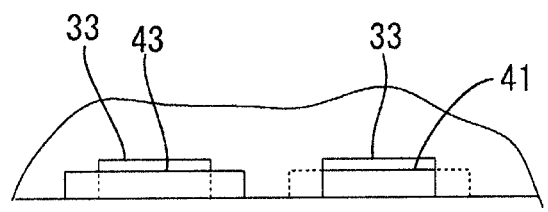
FIG. 17 shows an expanded view of the first engagement portion and the second engagement portion engaged on engaged projections.

Next, Embodiment 2 of the present invention is described with reference to FIGS. 15 through 17. In Embodiment 1, the first engagement portion 37 and the second engagement portion 39 were positionally offset in the opening direction of the engagement holes 38 and 40. However, in Embodiment 2, a first engagement portion 41 and a second engagement portion 43 are positioned by offsetting the positions thereof in a direction along a terminal edge of the cover main body 36, as shown in FIG. 16. Hereafter, configurations identical to those of Embodiment 1 are given identical reference numerals and descriptions thereof are omitted.

A cover 45 includes the flat plate-shaped cover main body 36, the first engagement portion 41, and the second engagement portion 43. The first engagement portion 41 is provided so as to project below the cover main body 36 (on the first surface side) and engages with the engaged projection 33 of the first battery wiring module 20A. The second engagement portion 43 is provided so as to project above the cover main body 36 (on the second surface side) and engages with the engaged projection 33 of the second battery wiring module 20B.

The first engagement portion 41 rises up in a squared frame shape (a squared "U" shape) in a direction orthogonal to the cover main body 36. A rectangular first engagement hole 42 runs through to an interior of the first engagement portion 41. When the cover 45 is placed on the battery wiring module 20A, the first engagement portion 41 abuts the inclined portion 33B of the engaged projection 33 and flexure deforms, then restoration deforms when the forefront end side of the first engagement portion 41 passes the engaged projection 33. Thereby, even when a force is generated in a direction that would remove the cover 45, the edge of the first engagement hole 41 is engaged on the stepped portion 33A on the bottom surface of the engaged projection 33 (FIG. 17), and thus the cover 45 in place is held so as to not be removed.

As shown in FIG. 16, the second engagement portion 43 rises up in a squared frame shape (squared "U" shape) identical to that of the first engagement portion 41 in a direction orthogonal to the cover main body 36 on the end (terminal edge) of the cover main body 36, and a rectangular second engagement hole 44 runs through to the interior of the first engagement portion 41. The second engagement portion 43 is formed by offsetting the position thereof from the first engagement portion 41 by a predetermined measurement (a measurement enabling molding with the die) in the direction along the terminal edge. In addition, as shown in FIG. 15, the first engagement portion 41 and the second engagement portion 43 are formed so as to rise up from the same position on the terminal edge (side edge) of the cover main body 36 on sides 180 degrees opposite to each other. When the cover 45 is placed on the battery wiring module 20B, the second engagement portion 43 abuts the inclined portion 33B of the engaged projection 33 and flexure deforms, then restoration deforms when the forefront end side of the second engagement portion 43 passes the engaged projection 33. Thereby, even when a force is generated in a direction that would remove the cover 45, the edge of the second engagement hole 43 is engaged by the step 33A on the bottom surface of the engaged projection 33 (FIG. 17), and thus the cover 45 in place is held so as to not be removed.

Moreover, the positions of the first engagement portion 41 and the second engagement portion 43 are offset in the direction along the terminal edge of the cover main body 36, and thus for the holding member 30B of the battery wiring module 20B, which differs from the battery wiring module 20A, a position of the engaged projection 33 can also be offset by a measurement corresponding to the measurement between the first engagement portion 41 and the second engagement portion 43.

According to Embodiment 2, the first engagement portion 41 and the second engagement portion 43 are formed in a line along the terminal edge of the cover main body 36. Therefore, molding with the die can be readily performed. In addition, both the first engagement portion 41 and the second engagement portion 43 are formed on the terminal edge of the cover main body 36, and thus surface area of the cover main body 36 can be effectively utilized.

Other Embodiments

The present invention is not limited to the embodiments according to the above description and the drawings; instead, the technical scope of the present invention also includes, for example, the following embodiments.

(1) In the above-described embodiments, an example was given in which the banks of single batteries 12A and 12B were located in symmetrical positions. However, an embodiment is not limited to this. When the first engagement portions 37 and 41 and the second engagement portions 39 and 43 are on both surfaces of the cover 35, as in the above-described embodiments, the cover 35 of the differently shaped battery wiring modules 20A and 20B (having attachment surfaces) can be universalized.

(2) The above-described embodiments were configured such that the first engagement portion 37 and the second engagement portion 39 of the cover 35 flexure deform. However, an embodiment is not limited to this. An engaged portion capable of flexure deforming may be provided on the battery wiring modules 20A and 20B sides, and a first engagement portion and a second engagement portion of the cover 35 may be configured to engage with the engaged portion. In addition, the engaged portion may be recessed and the first engagement portion and the second engagement portion may be configured to include a projection.

(3) A positional relationship between the first engagement portion 37 and the second engagement portion 39 is not limited to the configuration of the above embodiments. For example, the first engagement portions 37 and 41 and the second engagement portions 39 and 43 may be configured to have a positional relationship in which they are separated from each other more than in the above-described embodiments.

(4) A number of first engagement portions 37 and 41 and second engagement portions 39 and 43 is not limited to the number in the above embodiments and may be more or less than in the above embodiments.

(5) In the above embodiments, the electrode terminals 14A and 14B of the single battery 11 were configured to fasten together using bolts (a separate component) in a nut shape. However, an embodiment is not limited to this and may instead be configured such that an electrode terminal includes a pole-shaped shaft having a thread groove on an outer circumferential surface, and may be configured such that the connection members 21 and 25 are fixated to an electrode terminal by fastening a nut (a separate component) from above. In such a case, the shaft of the electrode terminal is passed through the through-holes 21A and 25A of the connection members 21 and 25, respectively.

(6) In the above-described embodiments, a description was given of a case where the plurality of single batteries 11 are connected serially. However, an embodiment is not limited to this and may also apply to a case where the plurality of single batteries 11 are connected in parallel, or may combine serial and parallel connections.

(7) The number of single batteries 11 configuring the battery modules 10A and 10B was given as seven. However, an embodiment is not limited to this. The number may be six or less or may be eight or more. The configuration of the battery wiring modules 20A and 20B can be set as appropriate according to the number of the single batteries 11 and the shape of the cover 35 can also be set as appropriate according to the shape of the battery wiring modules 20A and 20B.

DESCRIPTION OF REFERENCE NUMERALS 10A, 10B Battery module
11 Single battery
12A, 12B Bank of single batteries
14A, 14B Electrode terminal
20A, 20B Battery wiring module
21 Long connection member (connection member)
25 Short connection member (connection member)
30A, 30B Holding member
31 Accommodator
32 Separation regulating piece
33 Engaged projection (engaged portion)
35, 45 Cover
36 Cover main body
36A Long side
36B Short side
37, 41 First engagement portion
38, 42 First engagement hole
39, 43 Second engagement portion
40, 44 Second engagement hole

The invention claimed is:

1. A cover of a battery wiring module that includes a connection member electrically connecting electrode terminals of a bank of single batteries having a plurality of aligned single batteries having positive and negative electrode terminals, the cover comprising:
   a plate-shaped cover main body covering the battery wiring module;
   a first engagement portion projecting orthogonally from a first surface side of the cover main body, and a first engagement hole through the first engagement portion in a direction along the first surface side of the cover main body and configured to engage with an engaged portion of the battery wiring module; and
   a second engagement portion projecting orthogonally from a second surface side of the cover main body, and a second engagement hole through the second engagement portion in a direction along the second surface side of the cover main body and configured to engage with an engaged portion of a battery wiring module that is different from the battery wiring module.

2. The cover of the battery wiring module according to claim 1, wherein each engaged portion is a projection projecting from a side wall of the battery wiring module and which advances into a respective engagement hole, and
   the projection is engaged on an edge of the engagement hole.

3. The cover of the battery wiring module according to claim 2, wherein the first engagement portion and the second engagement portion are mutually positionally offset in an opening direction of the engagement holes.

4. The cover of the battery wiring module according to claim 2, wherein the first engagement portion and the second engagement portion are offset in a line along a terminal edge of the cover main body.

5. A battery wiring module covered by the cover according to claim 1.

6. A battery module comprising a plurality of single batteries and the battery wiring module according to claim 5 attached to the plurality of single batteries.

7. A battery wiring module covered by the cover according to claim 2.

8. A battery module comprising a plurality of single batteries and the battery wiring module according to claim 7 attached to the plurality of single batteries.

9. A battery wiring module covered by the cover according to claim 3.

10. A battery module comprising a plurality of single batteries and the battery wiring module according to claim 9 attached to the plurality of single batteries.

11. A battery wiring module covered by the cover according to claim 4.

12. A battery module comprising a plurality of single batteries and the battery wiring module according to claim 11 attached to the plurality of single batteries.

* * * * *